United States Patent
Das et al.

(10) Patent No.: US 9,544,869 B2
(45) Date of Patent: Jan. 10, 2017

(54) METHOD FOR ADAPTING TO VENUE POSITIONING CAPABILITIES

(71) Applicant: QUALCOMM Incorporated, San Diego, CA (US)

(72) Inventors: Saumitra Mohan Das, Santa Clara, CA (US); Sai Pradeep Venkatraman, Santa Clara, CA (US); Weihua Gao, San Jose, CA (US); Ju-Yong Do, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 13/896,154

(22) Filed: May 16, 2013

(65) Prior Publication Data

US 2014/0342662 A1    Nov. 20, 2014

(51) Int. Cl.
*H04B 7/24* (2006.01)
*H04W 64/00* (2009.01)
*H04W 4/02* (2009.01)

(52) U.S. Cl.
CPC ............ *H04W 64/003* (2013.01); *H04W 4/02* (2013.01); *H04W 64/00* (2013.01)

(58) Field of Classification Search
CPC .......... H04W 4/04; H04W 4/023; H04W 4/02; H04W 64/00; G01S 5/0236
USPC ...... 455/456.1, 456.2, 456.3, 457, 404.2, 39
See application file for complete search history.

(56) References Cited

U.S. PATENT DOCUMENTS

| | | | |
|---|---|---|---|
| 8,099,103 B2 * | 1/2012 | Sung | G01S 5/0036 455/456.1 |
| 8,290,511 B2 | 10/2012 | Burdo et al. | |
| 2003/0083073 A1 * | 5/2003 | Cossins | H04L 41/0253 455/446 |
| 2004/0138807 A1 * | 7/2004 | Jha | H04W 4/02 455/456.2 |
| 2007/0232323 A1 | 10/2007 | Spriestersbach | |
| 2009/0005976 A1 * | 1/2009 | Hayashi | G01C 21/20 701/533 |
| 2010/0253577 A1 | 10/2010 | Fujiwara | |
| 2011/0212733 A1 * | 9/2011 | Edge | G01S 5/0036 455/456.1 |
| 2012/0021762 A1 * | 1/2012 | Garin | G01C 21/206 455/456.1 |
| 2012/0021776 A1 * | 1/2012 | Phillips | G06Q 30/0282 455/456.3 |

(Continued)

FOREIGN PATENT DOCUMENTS

WO    WO-2013033464 A2    3/2013

OTHER PUBLICATIONS

International Search Report and Written Opinion—PCT/US2014/038261—ISA/EPO—Dec. 4. 2014.

*Primary Examiner* — Md Talukder
(74) *Attorney, Agent, or Firm* — Berkeley Law & Technology Group, LLP (57) ABSTRACT

Particular embodiments disclosed herein are directed to methods, systems and/or devices for mobile assisted positioning. A mobile station may receive positioning assistance data from a server enabling or supporting one or more positioning operations in a venue. In a particular implementation, the mobile device may alter execution of one or more applications based, at least in part, on an indication of particular positioning services or operations enabled or supported by positioning assistance data available at the server.

24 Claims, 6 Drawing Sheets

(56) References Cited

U.S. PATENT DOCUMENTS

| | | | |
|---|---|---|---|
| 2012/0158297 A1 | 6/2012 | Kim | |
| 2012/0258733 A1* | 10/2012 | Fischer | H04W 4/20 455/456.1 |
| 2014/0256346 A1* | 9/2014 | Venkatraman | H04W 4/043 455/456.1 |
| 2014/0279123 A1* | 9/2014 | Harkey | H04L 67/18 705/26.1 |
| 2014/0342662 A1* | 11/2014 | Das | H04W 4/02 455/39 |

* cited by examiner

| | |
|---|---|
| only map information of venue is available to venue server and venue server does not support or enable positioning capability | App1 |
| map information of venue with associated routing information available to venue server but venue server provides positioning assistance data to enable or support positioning capability | App2 |
| venue server provides positioning assistance data enabling or supporting single point position fix capability with a relatively large median error | App3 |
| venue server provides positioning assistance data to enable or support rough positioning based, at least in part, on crowdsourced access point (AP) locations | App4 |

METHOD FOR ADAPTING TO VENUE POSITIONING CAPABILITIES

FIELD

The subject matter disclosed herein relates to wireless communication systems, and more specifically, to position determination methods and apparatuses for use with and/or by wireless mobile stations.

INFORMATION

GPS and other like satellite positioning systems have enabled navigation services for mobile handsets in outdoor environments. Since satellite signals may not be reliably received or acquired in an indoor environment, different techniques may be employed to enable navigation services. For example, mobile stations may obtain a position fix by measuring ranges to three or more terrestrial wireless access points that are positioned at known locations. Such ranges may be measured, for example, by obtaining a MAC address from signals received from such access points and obtaining range measurements to the access points by measuring one or more characteristics of signals received from such access points such as, for example, signal strength and round trip delay.

In particular indoor navigation applications, a mobile device may perform positioning operations by use of "assistance data" received from an external entity over a communication network. Such assistance data may include, for example, a digital map of an area, locations of transmitters (e.g., for use in obtaining position fixes by ranging), heatmap data (e.g., having expected received signal characteristics at discrete points in an indoor area), a routeability graph expressing routing constraints based upon navigable paths or areas, just to name a few examples. In particular implementations, a mobile device may determine its rough location, and communicate with one or more external entities in an indoor navigation system through a network to obtain assistance data.

BRIEF DESCRIPTION OF THE FIGURES

Non-limiting and non-exhaustive features will be described with reference to the following figures, wherein like reference numerals refer to like parts throughout the various figures.

SUMMARY

In an implementation, a method for location determination performed at a mobile station may comprise: transmitting one or more request messages to a server serving a venue, the one or more request messages requesting positioning assistance data; receiving from said server one or more response messages comprising an indication of a capability of said venue related to at least one location based service; and selecting based, at least in part, on said indication of said capability one of a plurality of levels of performance to affect execution of at least one positioning application hosted on said mobile station.

In another implementation, an mobile station may comprise: a transceiver to transmit messages to and receive messages from a communication network; and one or more processors to: initiate transmission of one or more request messages through said transceiver to a server serving a venue, the one or more request messages requesting positioning assistance data; obtain one or more response messages received from said server at said transceiver, said one or more response messages comprising an indication of a capability of said venue related to at least one location based service; and select based, at least in part, on said indication of said capability one of a plurality of levels of performance to affect execution of at least one positioning application hosted on said mobile station.

In still another implementation, a mobile station may comprise: means for transmitting one or more request messages to a server serving a venue, the one or more request messages requesting positioning assistance data; means for receiving from said server one or more response messages comprising an indication of a capability of said venue related to at least one location based service; and means for selecting based, at least in part, on said indication of said capability one of a plurality of levels of performance to affect execution of at least one positioning application hosted on said mobile station.

In yet another implementation, an article may comprise a non-transitory storage medium may comprise machine-readable instructions stored thereon which are executable by a special purpose computing apparatus of a mobile station to: initiate transmission of one or more request messages to a server serving a venue, the one or more request messages requesting positioning assistance data; obtain one or more response messages from said server, said one or more response messages comprising an indication of a capability of said venue related to at least one location based service; and select based, at least in part, on said indication of said capability one of a plurality of discretely selectable levels of performance to affect execution of at least one positioning application hosted on said mobile station, said selecting being based, at least in part, on said indication of said capability.

It should be understood that the aforementioned implementations are merely example implementations, and that claimed subject matter is not necessarily limited to any particular aspect of these example implementations.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile station which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some implementations, a "mobile station" may comprise a device that does not, cannot, or is not configured to wirelessly communicate with other entities. Thus, while a mobile station may be described in some embodiments as including wireless functionality or wirelessly communicating with one or more other devices, embodiments may include other implementations.

In particular indoor navigation applications, an MS may perform positioning operations by use of "assistance data" or "positioning assistance data" received from an external entity over a communication network. For example, such an external entity may comprise a computing server of a venue, such as an office building, shopping mall, and so on. Assistance data may include, for example, a digital map of the venue, locations of transmitters in the venue, heatmap data (e.g., having expected received signal characteristics at discrete points in the venue), a routeability graph expressing routing constraints based upon navigable paths or areas in the venue, just to name a few examples. In particular implementations, an MS may determine its rough location, and communicate with one or more external entities in an indoor navigation system through a network to obtain assistance data.

In some embodiments, an indoor navigation system (e.g., comprising a server) installed at a venue may evolve over time with improvements and enhancements providing a more useful and richer experience for a user with an MS entering the venue. For example, a more basic indoor navigation system at the venue may merely provide the user with assistance data including a searchable indoor map, but with no data to assist an MS with estimating its position of location on the indoor map. A more enhanced indoor navigation system may enable an MS to obtain a rough position of the mobile device based on crowdsourced locations of local access points. An even more enhanced indoor navigation system may provide the user with full positioning capabilities (e.g., radio heatmap or locations and identities of access points) with check-in (e.g., using Foursquare™ or other similar check-in service) or full tracking capabilities.

On the other hand, an indoor navigation system's capabilities of providing assistance data to support indoor navigation services may vary periodically or from time to time, or may be at least partially disabled (e.g., "out of order") for any of a number of reasons. For example, routine maintenance operations of any portion of an indoor navigation system may render a navigation system non-functional or partially functional for a period of time. In another example, an indoor navigation system installed at a venue may provide positioning assistance data sufficient to enable a client MS to execute a particular set of applications while another indoor navigation system may provide positioning assistance data sufficient to enable an MS to execute a different particular set of applications. Accordingly, one indoor navigation system may enable an MS to have different positioning capability than that enabled or supported by another indoor navigation system. In yet another example, a device used by an indoor navigation system, such as a WLAN access point, may be temporarily non-functional, which may render the system less capable of accurate positioning functions.

Aside from a possibility that a venue's navigation system's capabilities may be compromised due to maintenance or unintentional disorder, such capabilities may vary among venues. For example, some venue's navigation systems may not enable positioning operations involving signal round-trip-time calculations between an MS and access points (APs). Some venues may include more APs than other venues. Some venues may include APs positioned at locations that are only approximately known using crowd-sourcing techniques. Some venues may provide positioning assistance data enabling an MS to perform positioning with tracking. Some venues may provide a venue map, but not assistance data sufficient to enable positioning operations at a mobile station. And so on.

Without prior knowledge of a venue's capabilities of providing assistance data to support particular indoor navigation services, an application on an MS entering the venue may attempt to execute a particular service that is not supportable by the available assistance data. Such a situation may provide erroneous or sub-standard results.

In an embodiment, an MS may communicate with a venue server to determine the venue server's capability of providing assistance data to enable or support particular indoor navigation services. Such communication may occur upon or soon after the MS enters the venue. As mentioned above, utility of providing assistance data may vary among different venues, and may vary for a single venue over time. In a particular implementation, an MS may modify its subsequent behavior or operations in response to determining the venue server's capabilities. An MS tailoring its behavior based, at least in part, on venue capabilities may provide a number of benefits. For example, if a venue server is experiencing technical problems or maintenance, mapping or positioning services may consequently degrade. In such a case, a user of an MS need not be frustrated by poor navigation performance, particularly if the user has no reason to expect such poor performance. Instead, the MS may display a message indicating a reason for the poor performance, and may display an estimated time that proper performance may resume, for example.

Accordingly, in an embodiment, an MS moving into an area (e.g., a venue such as an indoor pedestrian navigation environment) may contact a server at a venue to request positioning assistance data by transmitting one or more request messages. In response to the request messages, the server may transmit one or more response messages including positioning assistance data. The positioning assistance data may, for example, be provided to the MS in a particular file format with a header and payload, etc. In a particular implementation, the header may indicate particular indoor navigation capabilities enabled by the particular assistance data provided.

Based, at least in part, on this indication, execution or functionality of one or more applications hosted by the MS may be modified. For example, an application may opt to not execute, or the application may tailor its performance based, at least in part, on an availability of positioning assistance data to support or enable particular positioning operations. In another implementation, the application may display a maintenance message to the user rather than compute a position with a large uncertainty or tolerate a very long time to obtain a position fix. In another implementation, an MS may use an indication of indoor navigation capabilities available at a venue to change particular functionality available to a user of the MS. In yet another implementation, an MS may select to execute, or not to execute one or more applications or update such applications based, at least in part, on an indication of indoor navigation capabilities of a venue server.

Various techniques are described herein which may be implemented in one or more land-based computing platforms or an MS to determine, among other things, indoor positioning. In an implementation, an MS may transmit one or more request messages to a venue server serving a venue. Such request messages may request positioning assistance data. In response to the one or more request messages, the MS may receive one or more response messages comprising an indication of a capability of the venue in providing at least one location based service. Subsequently, the MS may select one of a plurality of discretely selectable levels of performance to affect execution of at least one positioning application hosted on the MS. In one implementation, the MS may select a discretely selectable level of performance based, at least in part, on the indication of capability in the received one or more response messages. For example, "discretely selectable levels of performance" may refer to a plurality of modes in which an MS may operate. Different operating modes of an MS may correspond to different levels of positioning performance. Moreover, different operating modes of an MS may generate different experiences for a user of the MS. For example, in one operating mode an MS may display a digital map showing a position of the MS on the map. In another operating made, the MS may display a message describing a maintenance status of a venue server. In yet another operating mode, the MS may display a digital map showing local features, without showing a position of the MS on the map.

In one example implementation, an indication of a capability to support particular positioning operations may be provided in a response message received by an MS may comprise a flag in a header of positioning assistance data provided to the MS. Such an indication of capability may indicate any of a number of conditions such as, for example: a venue server has available map information of a venue but does not have available positioning assistance data to support or enable one or more positioning operations at an MS (e.g., available positioning assistance data including a digital map but no radio heatmap or locations of transmitters/ transceivers for obtaining a position fix); a venue server has available map information of a venue with associated routing information but does not have available positioning assistance data to support or enable one or more positioning operations at an MS (e.g., available positioning assistance data including a digital map with routing indications but no radio heatmap or locations of transmitters/transceivers for obtaining a position fix); a venue server has available positioning assistance data to enable or support single point position fix operations at a mobile device to obtain a rough position estimate with a relatively large median error (e.g., available positioning assistance data including a coarse radio heatmap or knowledge of locations of transmitters/transceivers with low accuracy (within a few meters); a venue server has available positioning assistance data to enable or support obtaining a is capable of rough positioning based, at least in part, on crowdsourced access point (AP) locations (e.g., available positioning assistance data including no radio heatmap but knowledge of locations of transmitters/ transceivers with low accuracy (within 30.0 meters); a venue has available positioning assistance data to enable or support positioning operations with tracking capabilities (e.g., available positioning assistance data including a fine grain radio heatmap or knowledge of locations of transmitters/transceivers with high accuracy); and the venue server has available positioning assistance data to enable positioning operations at an MS and check-in capabilities, just to list a few examples (e.g., available positioning assistance data includes a database associating points of interest with regions on a map to enable a recipient MS to associate its current location with a location of a POI for use in check-in procedure).

Figure 1:
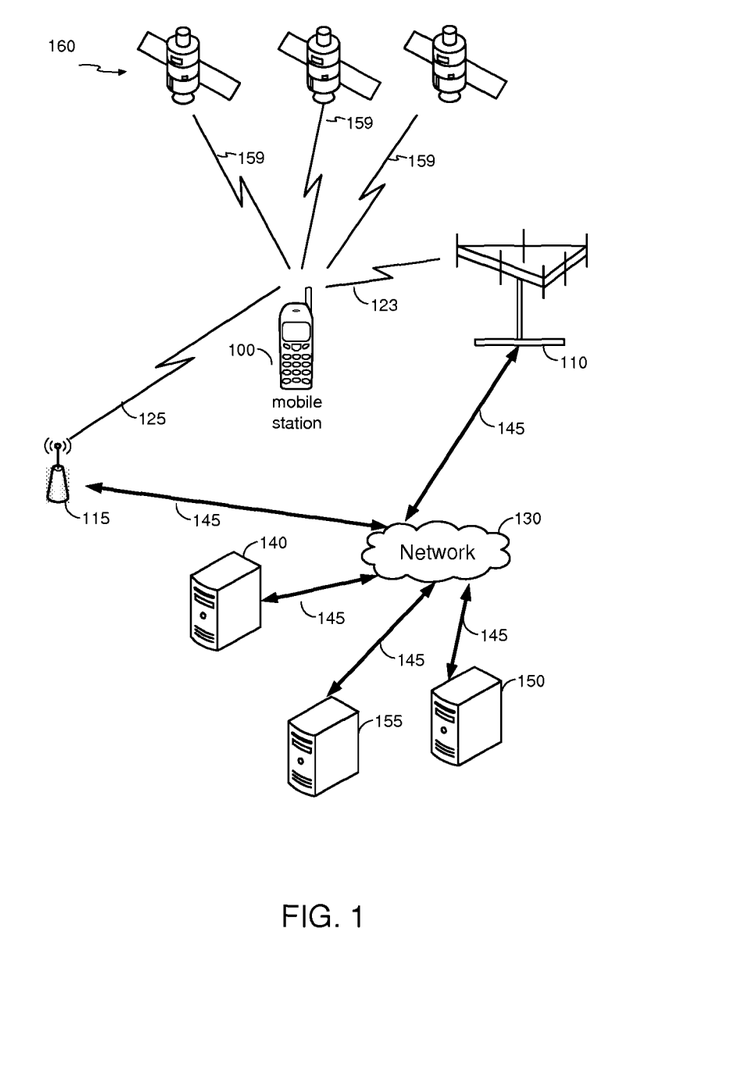
FIG. 1 is a system diagram illustrating certain features of a system containing a mobile station, in accordance with an implementation.

FIG. 1 is a system diagram illustrating certain features of a system containing a mobile station, in accordance with an implementation. An MS 100 may receive or acquire satellite positioning system (SPS) signals 159 from SPS satellites 160. In some implementations, SPS satellites 160 may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In addition, the MS 100 may transmit radio signals to, and receive radio signals from, a wireless communication network. In one example, MS 100 may communicate with a cellular communication network by transmitting wireless signals to, or receiving wireless signals from, a base station transceiver 110 over a wireless communication link 123. Similarly, MS 100 may transmit wireless signals to, or receiving wireless signals from a local transceiver 115 over a wireless communication link 125.

In a particular implementation, local transceiver 115 may be configured to communicate with MS 100 at a shorter range over wireless communication link 123 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course, it should be understood that these are merely examples of networks that may communicate with an MS over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between MS 100 and servers 140, 150 or 155 through local transceiver 115 or base station transceiver 110. In another implementation, network 130 may comprising cellular communication network infrastructure such as, for example, a base station controller or master switching center to facilitate mobile cellular communication with MS 100.

In particular implementations, and as discussed below, MS 100 may have circuitry and processing resources capable of computing a position fix or estimated location of MS 100. For example, MS 100 may compute a position fix based, at least in part, on pseudorange measurements to four or more SPS satellites 160. Here, MS 100 may compute such pseudorange measurements based, at least in part, on pseudonoise code phase detections in signals 159 acquired from four or more SPS satellites 160. In particular implementations, MS 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, MS 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from MS 100 may be measured to three or more of such terrestrial transmitters fixed at known locations based, at least in part, on pilot signals transmitted by the transmitters fixed at known locations and received at MS 100. Here, servers 140, 150 or 155 may be capable of providing positioning assistance data to MS 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, MS 100 may not be capable of acquiring signals 159 from a sufficient number of SPS satellites 160 or perform AFLT or OTDOA to compute a position fix. Alternatively, MS 100 may be capable of computing a position fix based, at least in part, on signals acquired from local transmitters (e.g., femto cells or WLAN access points positioned at known locations). For example, MSs may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, MS 100 may obtain an indoor position fix by applying characteristics of acquired signals to a radio context parameter map indicating expected RSSI or RTT values at particular locations in an indoor area.

In particular implementations, MS 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio context parameter maps, locations and identities of transmitters, routeability graphs, just to name a few examples. Other assistance data received by the MS may include, for example, local maps of indoor areas for display or to aid in navigation. Such a map may be provided to MS 100 as MS 100 enters a particular indoor area. Such a map may show indoor features such as doors, hallways, entry ways, walls, etc., points of interest such as bathrooms, pay phones, room names, stores, etc. By obtaining and displaying such a map, an MS may overlay a current location of the MS (and user) over the displayed map.

In one implementation, a routeability graph and/or digital map may assist MS 100 in defining feasible areas for navigation within an indoor area and subject to physical obstructions (e.g., walls) and passage ways (e.g., doorways in walls). Here, by defining feasible areas for navigation, MS 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular implementation, MS 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of MS 100.

According to an implementation, MS 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at MS 100 and data transmission resources may make receipt of indoor positioning assistance data for all areas served by servers 140, 150 or 155 impractical or infeasible, a request for indoor navigation assistance data from MS 100 may indicate a rough or course estimate of a location of MS 100. MS 100 may then be provided indoor navigation assistance data covering areas including and/or proximate to the rough or course estimate of the location of MS 100. In some embodiments, one or more positioning techniques, for example probabilistic positioning or other techniques, may be used in association with one or more context maps to determine a position of the MS 100. For example, methods that may be used with RSSI representations of a wireless environment—which may be referred to as "heatmaps" in some contexts—may be applied to sensor measurements and/or sensor signatures and/or sensor signals (or context or social data) as represented by one or more context maps. In some embodiments, one or more filters described below, for example a particle filter, may be used with the data described above to perform such positioning.

In one particular implementation, a request for indoor navigation assistance data from MS 100 may specify a location context identifier (LCI). Such an LCI may be associated with a locally defined area such as, for example, a particular floor of a building or other indoor area which is not mapped according to a global coordinate system. In one example server architecture, upon entry of an area, MS 100 may request a first server, such as server 140, to provide one or more LCIs covering the area or adjacent areas. Here, the request from the MS 100 may include a rough location of MS 100 such that the requested server may associate the rough location with areas covered by known LCIs, and then transmit those LCIs to MS 100. MS 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio context parameter maps or routeability graphs). In an embodiment, an MS, such as 100, need not communicate wirelessly to perform techniques described above. Claimed subject matter is not limited to wired or wireless communication, but some embodiments may include wired or wireless communication, or a device enabled for such communication.

Figure 2:
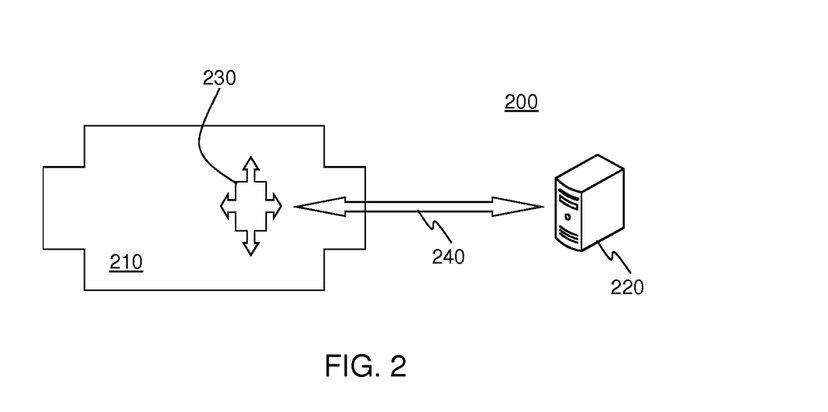
FIG. 2 is a schematic block diagram illustrating a mobile station in a venue, according to an implementation.

FIG. 2 is a schematic block diagram illustrating an MS 230 in a venue 210, according to an implementation 200. For example, MS 230 travelling into an area (e.g., such as an indoor pedestrian navigation environment) may contact a server 220 of venue 210 to request positioning assistance data by transmitting one or more request messages, as indicated by communication arrow 240. In response to the request messages, server 220 may transmit one or more response messages, as indicated by communication arrow 240, including positioning assistance data. Though any of a number of techniques may be used, in one implementation positioning assistance data may be provided to MS 230 in a particular file format with a header and payload, etc. In a particular implementation, such a header may indicate particular indoor navigation capabilities enabled by the particular assistance data provided.

Based, at least in part, on this indication one or more applications on MS 230 may tailor execution of operation of the MS. For example, an application may opt to not execute or update its performance based on an availability of particular positioning capabilities (e.g., of server 220). In another implementation, the application may display a maintenance message to the user rather than compute a position with a large uncertainty or tolerate a very long time to obtain a position fix. In one particular example implementation, a user may launch or open a digital map for presentation on a display device of an MS and then attempt to specify a route for navigation on the presented map. If specifying the route for navigation is not enabled or supported by the available positioning assistance data, a message may be presented on the display device (e.g., "this service is temporarily unavailable).

In another implementation, information technology services, for example, at a venue may automatically change an indicator of capabilities of the venue (e.g., provided in a message responding to a request for positioning assistance data), for example, in response to crowdsourced data indicating anomalies.

In an embodiment, as MS 230 may remain in or near venue 210 (either moving or stationary), the MS may receive an updated indication of a positioning capability supported or enabled by a venue server 220. For example, MS 230 may query a venue server for an updated indication of a positioning capability supported or enable by venue server 220. Accordingly, the MS may transmit a request for such an update periodically or from time to time. In another example, venue server 220 may broadcast to one or more MSs, or transmit directly to one or more particular MSs, such an update. In one implementation, venue server 220 may provide such an update upon or after occurrence of a change in positioning capabilities enabled or supported by venue server 220. In response to receiving such an updated indication of capabilities supported or enabled by venue server 220, MS 230 may re-select another one of a discretely selectable level of performance.

According to an embodiment, positioning assistance data may be temporarily unavailable from venue server 220 (e.g., service turned off or deactivated for maintenance or security issue, etc.). Here, in response to a request for positioning assistance data from an MS, venue server 220 may respond with a message indicating that all or a portion of the requested positioning assistance data is not presently available. In a particular implementation, the response message from venue server 220 may further indicate that the requested positioning assistance data may be available at some time in the future, and that the requesting MS may request the presently unavailable positioning assistance data in the future (e.g., with a time when the requested positioning assistance data is likely to be available upon request from venue server 220 in the future). The MS may then display a message to a user indicating that particular positioning capabilities are not available at the present time, and that the MS may in the future try to request the presently unavailable positioning assistance data to support or enable the particular positioning capabilities (that are presently unavailable).

Figure 3:
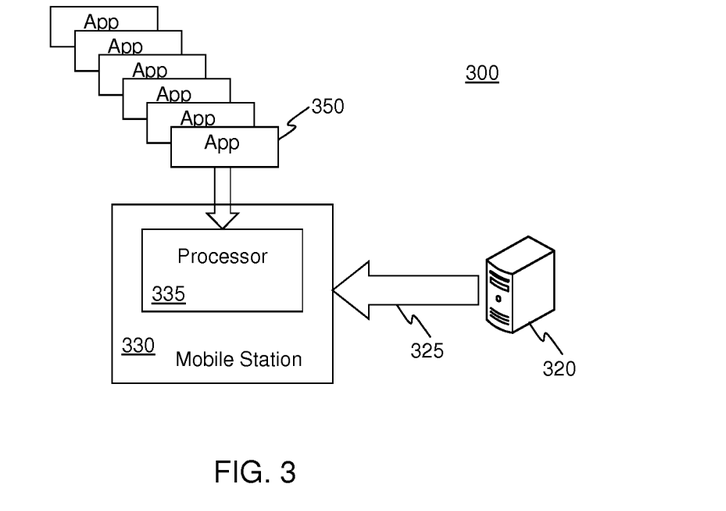
FIG. 3 is a schematic block diagram illustrating a mobile station capable of processing various applications corresponding to discretely selectable levels of performance, according to an implementation.

In another embodiment, particular positioning capabilities may not be uniformly available over all portions of a venue served by venue server 220. For example, a high accuracy positioning capability may only be available in a portion of a venue (e.g., only in particular conference rooms of a hotel) and not in another portion of the venue (e.g., in an entrance to the hotel lobby or close to exterior walls). As such, venue server 220 may respond to a request for positioning assistance data with an indication of particular positioning capabilities being supported in particular portions of a venue (e.g., an indication of high accuracy positioning capabilities enabled or supported in particular conference rooms and lower accuracy positioning capability enabled or supported in the entrance area). In one particular implementation, venue server 220 may specify polygons in which particular positioning capabilities are enabled or supported (e.g., defining an area bounded by a polygon by specifying coordinates (0,0), (10,0), (15,20) and (0,20)). A requesting MS respond to non-uniform availability of accordingly FIG. 3 is a schematic block diagram illustrating an MS 330 capable of processing various applications 350 corresponding to discretely selectable levels of performance (e.g., in response to an availability of positioning assistance data to support such discretely selectable levels of performance), according to an implementation 300. Individual applications 350 may comprise at least a portion of an executable file. For example, an application may comprise a subroutine of a larger executable file.

MS 330 may be similar to MS 230 located in a particular venue that includes a venue server 320. As in the case described above for MS 230, MS 330 may contact server 320 to request positioning assistance data by transmitting one or more request messages. In response to the request messages, server 320 may transmit one or more response messages, as indicated by communication arrow 325, including positioning assistance data. Though any of a number of techniques may be used, in one implementation positioning assistance data may be provided to MS 330 in a particular file or packet format with a header and payload, etc. In a particular implementation, such a header may indicate particular indoor navigation capabilities enabled or supported by the particular assistance data provided.

Based, at least in part, on this indication, a processor 335 of MS 330 may select to execute any of a number of applications 350, which may comprise executable files maintained in memory of MS 230. Subsequent operation of the MS may be based, at least in part, on which among applications 350 are selected for execution. For example, such applications may individually correspond to discretely selectable levels of performance of the MS. While FIG. shows distinct, different applications 350, it should be understood that such distinct, different applications may share common source/object code modules, routines, functions, etc.

Figure 4:
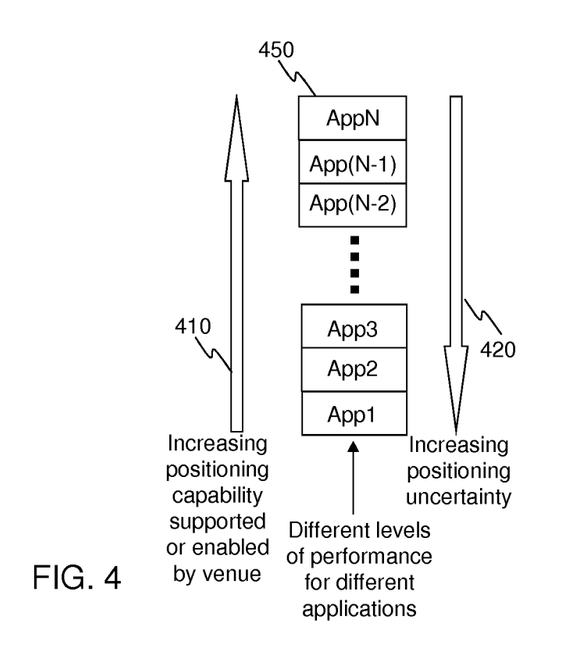
FIG. 4 is a schematic diagram illustrating some properties of various applications corresponding to discretely selectable levels of performance, according to an implementation.

FIG. 4 is a schematic diagram illustrating some properties of applications 450 corresponding to discretely selectable levels of performance, according to an implementation. For example, returning to FIG. 3, processor 335 of MS 330 may select among a number of applications 350, which may be similar to applications 450 in FIG. 4. Different applications hosted by an MS may correspond to different distinctly selectable levels of performance for locating the MS. As discussed above, an MS may select any of applications 450 based, at least in part, on particular positioning capability(ies) supported or enabled by a venue server. As schematically represented in FIG. 4, as positioning capability 410 supported or enabled by a venue increases, positioning uncertainty 420 may decrease. Thus, for example, App1 may comprise an application corresponding to a particularly weak positioning capability enabled or supported by a venue, which may yield a relatively high, and undesirable, positioning uncertainty. App1 may correspond to a situation where a venue server is at least partially out of order and may only have an ability to provide a visiting MS with a digital map, but may not have an ability to provide positioning assistance data enabling or supporting the MS to locate itself on the map. In another example, App2 may correspond to a situation where a venue server is at least partially out of order but may have an ability to provide a visiting MS with a digital map and positioning assistance data enabling or supporting the MS to locate itself on the map, but with a relatively large uncertainty. In yet another example, AppN may correspond to a situation where a venue server is in full working order and may have an ability to provide a visiting MS with a digital map, as well as positioning assistance data enabling the MS to locate itself on the map with relatively low uncertainty.

Figure 5:
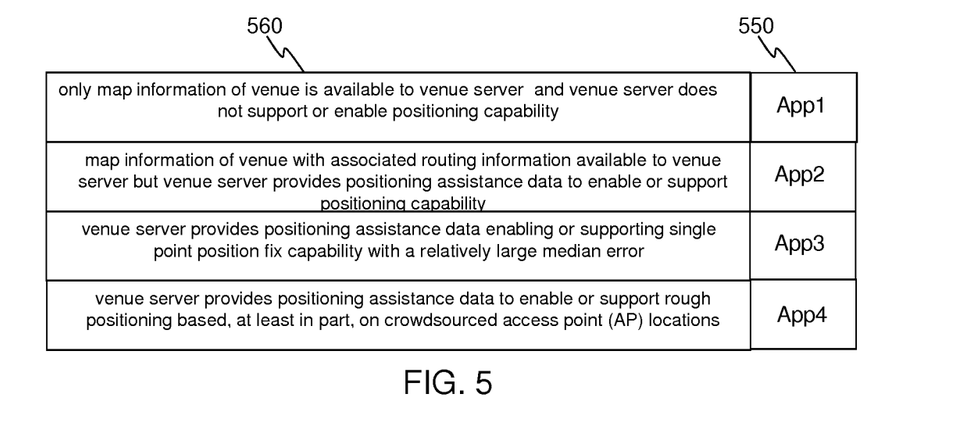
FIG. 5 is a table listing indication of capabilities of a venue server and various applications that may be executed in response to such indication, according to an implementation.

FIG. 5 is a table mapping applications to positioning capabilities. In a particular example, App2 may comprise at least a portion of an executable file selected by the MS in response to an indication of a particular capability enabled or supported by the venue server. As explained above, individual applications 550 may correspond to discretely selectable levels of performance, according to an implementation.

In one example, App1 may comprise at least a portion of an executable file selected by an MS in response to an indication of a supported or enabled positioning capability including an indication of availability of map information of the venue, but that the venue server does not support or enable positioning capability. In another example, App2 may comprise at least a portion of an executable file selected by the MS in response to an indication of a positioning capability supported by the available map information of the venue with associated routing information, and the venue server has no positioning capability. In yet another example, App3 may comprise at least a portion of an executable file selected by the MS in response to an indication of has single point position fix capability with a relatively large median error. In still another example, App4 may comprise at least a portion of an executable file selected by the MS in response to an indication that the venue server is capable of providing positioning assistance data enabling or supporting rough positioning based, at least in part, on crowdsourced access point (AP) locations. Though merely four indications of capabilities potentially enabled or supported by a venue server are listed, any number of such indications of capabilities may be considered, and claimed subject matter is not so limited.

Figure 6:
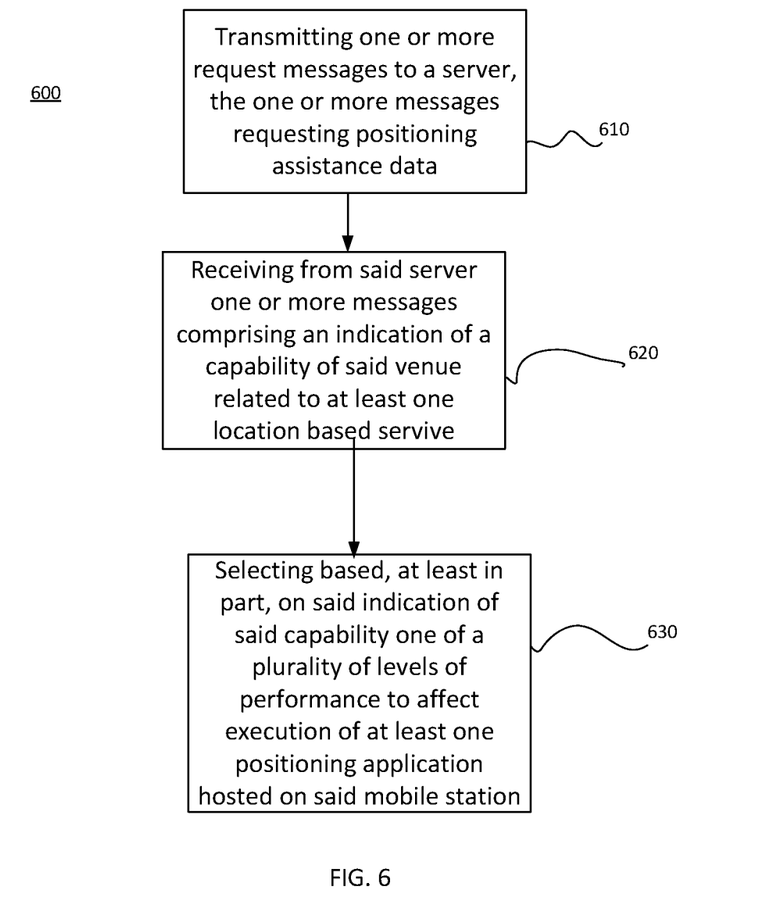
FIG. 6 is a flow diagram illustrating a process for estimating a location of a mobile station, according to an implementation.

FIG. 6 is a flow diagram illustrating a process 600 for estimating a location of an MS, according to an implementation. Process 600 may be performed by an MS, such as MS 100, or a server, such as 140, shown in FIG. 1, for example. At block 610, an MS may transmit one or more request messages to a server (such as a venue server) serving a venue. Such request messages may request positioning assistance data, for example. At block 620, the MS may receive one or more response messages (e.g., transmitted in response to the one more request messages) comprising an indication of a capability of the venue relating to at least one location based service. For example, such an indication may comprise an indication of the venue in supporting or enabling at least one location based service. At block 630, the MS may select one of a plurality of levels of performance (e.g., discretely selectable levels of performance) to affect execution of at least one positioning application hosted on the MS. One such application, for example, may be used to determine a position fix of the MS. Such selecting may be based, at least in part, on an indication of a particular capability. For example, selecting one of a plurality of levels of performance may comprise selectively enabling a check-in feature if the indication indicates that a venue server enables or supports such a check-in capability. In one implementation, any of a plurality of levels of performance may manage, at least in part, operation of electronic hardware in an MS.

Positioning applications may be hosted on an MS as machine-executable instructions that are stored on a non-transitory storage medium to process signals, control hardware devices, etc., to carry out one or more positioning functions (e.g., to affect a user experience). A mobile station may host multiple positioning applications that are executable in combination with other applications or individually as stand-alone positioning applications. One positioning application, for example, may compute a position fix based on measurements for display to a user. Another positioning application may compute a trajectory of movement of the MS based, at least in part, on one or more computed position fixes. Another positioning application may present a map on a display device to aid a user in navigation. It should be understood, that these are merely examples of how a positioning application on an MS may execute or behave, and that claimed subject matter is not limited in this respect.

In one implementation, execution of an application may be affected (e.g., based, at least in part, on an indication of capability of venue related to at least one location based service). Based, at least in part, a selected level of performance execution of at least one positioning application may be affected by executing the positioning application in a particular state. Such a particular execution state may comprise, for example, full execution, dormancy or non-execution, partial execution, execution with limited data input, just to provide a few examples. The particular execution state may, in turn, affect the richness of a user experience (e.g., affecting the presence or absence of images provided on a display device to aid navigation, the presence of other audible or other signal perceivable by a user to aid navigation function).

In one implementation, an MS may display an indicator representative of a capability of a venue. For example, such an indicator may convey information to a user (e.g., via a display) regarding maintenance status of a venue server, status of APs in the venue, and Wi-Fi availability, just to name a few examples.

Figure 7:
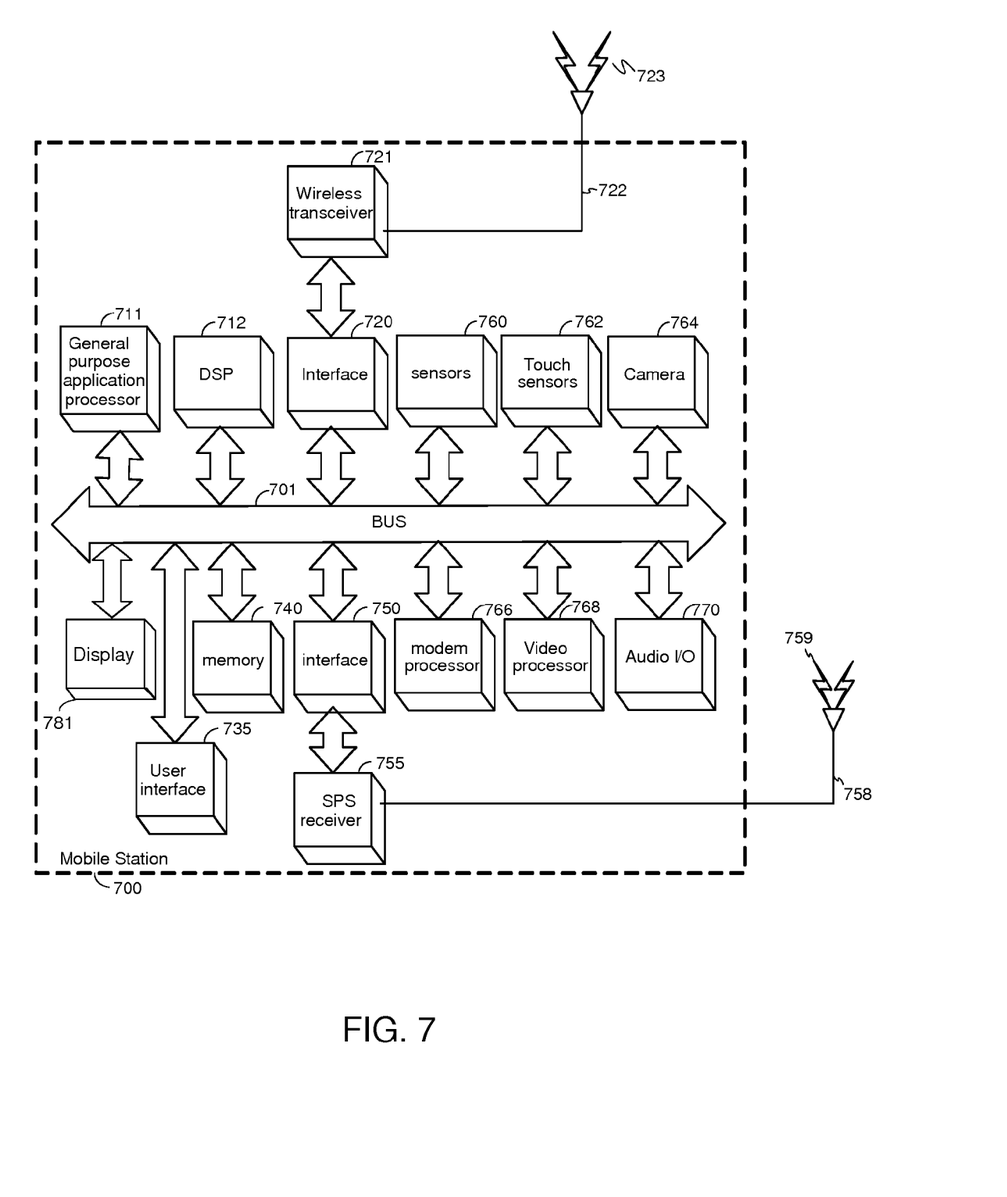
FIG. 7 is a schematic block diagram illustrating an exemplary mobile station, in accordance with an implementation.

FIG. 7 is a schematic diagram of an MS according to an implementation. MS 700 may comprise one or more features of MS 100 shown in FIG. 1, for example. In certain embodiments, processes such as 600, for example, may be implemented using elements included in MS 700. In other embodiments, MS 700 may determine a location of an MS by providing means for transmitting one or more request messages requesting positioning assistance data to a venue server serving a venue; means for receiving, in response to the request messages, one or more response messages comprising an indication of a capability of the venue in providing at least one location based service; and means for selecting one of a plurality of discretely selectable levels of performance to affect execution of at least one positioning application hosted on the MS, wherein the selecting may be based, at least in part, on the indication of the capability.

In certain implementations, MS 700 may comprise a wireless transceiver 721 which is capable of transmitting and receiving wireless signals 723 via an antenna 722 over a wireless communication network, such as over a wireless communication link 123, shown in FIG. 1, for example. Wireless transceiver 721 may be connected to bus 701 by a wireless transceiver bus interface 720. Wireless transceiver bus interface 720 may, in some implementations be at least partially integrated with wireless transceiver 721. Some implementations may include multiple wireless transceivers 721 and wireless antennas 722 to enable transmitting and/or receiving signals according to a corresponding multiple wireless communication standards such as, for example, WiFi, CDMA, WCDMA, LTE and Bluetooth, just to name a few examples.

MS 700 may also comprise SPS receiver 755 capable of receiving and acquiring SPS signals 759 via SPS antenna 758. SPS receiver 755 may also process, in whole or in part, acquired SPS signals 759 for estimating a location of MS 700. In some implementations, general-purpose processor(s) 711, memory 740, DSP(s) 712 and/or specialized processors (not shown) may also be utilized to process acquired SPS signals, in whole or in part, and/or calculate an estimated location of MS 700, in conjunction with SPS receiver 755. Storage of SPS or other signals for use in performing positioning operations may be performed in memory 740 or registers (not shown).

Also shown in FIG. 7, MS 700 may comprise digital signal processor(s) (DSP(s)) 712 connected to the bus 701 by a bus interface 710, general-purpose processor(s) 711 connected to the bus 701 by a bus interface 710 and memory 740. Bus interface 710 may be integrated with the DSP(s) 712, general-purpose processor(s) 711 and memory 740. In various implementations, functions or processes, such as process 600 shown in FIG. 6, for example, may be performed in response to execution of one or more machine-readable instructions stored in memory 740 such as on a computer-readable storage medium, such as RAM, ROM, FLASH, or disc drive, just to name a few example. The one or more instructions may be executable by general-purpose processor(s) 711, specialized processors, or DSP(s) 712. In one implementation, for example, one or more machine-readable instructions stored in memory 740 may be executable by a processor(s) 711 to: generate one or more request messages for transmission to a venue server serving a venue, the one or more request messages requesting positioning assistance data; initiate transmission of the one or more request messages to the venue server; process one or more response messages received in response to the one more request messages, the one or more response messages comprising an indication of a capability of the venue in providing at least one location based service; and select one of a plurality of discretely selectable levels of performance to affect execution of at least one positioning application hosted on the MS, wherein the selecting may be based, at least in part, on the indication of the capability of the venue server.

Also shown in FIG. 7, a user interface 735 may comprise any one of several devices such as, for example, a speaker, microphone, display device, vibration device, keyboard, and touch screen, just to name a few examples. In a particular implementation, user interface 735 may enable a user to interact with one or more applications hosted on MS 700. For example, devices of user interface 735 may store analog or digital signals on memory 740 to be further processed by DSP(s) 712 or general purpose processor 711 in response to action from a user. Similarly, applications hosted on MS 700 may store analog or digital signals on memory 740 to present an output signal to a user. In another implementation, MS 700 may optionally include a dedicated audio input/output (I/O) device 770 comprising, for example, a dedicated speaker, microphone, digital to analog circuitry, analog to digital circuitry, amplifiers and/or gain control. It should be understood, however, that this is merely an example of how an audio I/O may be implemented in an MS, and that claimed subject matter is not limited in this respect. In another implementation, MS 700 may comprise touch sensors 762 responsive to touching or pressure on a keyboard or touch screen device.

MS 700 may also comprise a dedicated camera device 764 for capturing still or moving imagery. Camera device 764 may be used as an environmental sensor, for example. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 711 or DSP(s) 712. Alternatively, a dedicated video processor 768 may perform conditioning, encoding, compression or manipulation of signals representing captured images. Additionally, video processor 768 may decode/decompress stored image data for presentation on a display device 781 on MS 700.

MS 700 may also comprise sensors 760 coupled to bus 701 which may include, for example, inertial sensors and environment sensors that may be used for determining measurement values, as described above. Inertial sensors of sensors 760 may comprise, for example accelerometers (e.g., collectively responding to acceleration of MS 700 in three dimensions), one or more gyroscopes or one or more magnetometers (e.g., to support one or more compass applications). Environment sensors of MS 700 may comprise, for example, temperature sensors, barometric pressure sensors, ambient light sensors, camera imagers, and microphones, just to name few examples. Sensors 760 may generate analog or digital signals that may be stored in memory 740 and processed by DPS(s) or general purpose processor 711 in support of one or more applications such as, for example, applications directed to positioning or navigation operations.

In an implementation, inertial sensors and/or environment sensors may be used for determining measurement values, as described above. For example, measurements from inertial sensors may be used to determine an activity state of a user, such as sitting, standing, walking, and so on. In another example, moving average speed may be calculated using measurements from inertial sensors or from position fixes. In another example, turn-rate, e.g., a moving average of orientation change, may be calculated using measurements from inertial sensors during a fixed window of time. In yet another example, displacement, e.g., a distance between position fixes separated by a relatively long time interval may also be calculated using measurements from inertial sensors during a fixed window of time. In still another example, a shape of a path or trajectory may be determined by calculating dimensions of a bounding box around position fixes over a fixed time interval.

In a particular implementation, MS 700 may comprise a dedicated modem processor 766 capable of performing baseband processing of signals received and downconverted at wireless transceiver 721 or SPS receiver 755. Similarly, modem processor 766 may perform baseband processing of signals to be upconverted for transmission by wireless transceiver 721. In alternative implementations, instead of having a dedicated modem processor, baseband processing may be performed by a general purpose processor or DSP (e.g., general purpose/application processor 711 or DSP(s) 712). It should be understood, however, that these are merely examples of structures that may perform baseband processing, and that claimed subject matter is not limited in this respect.

Figure 8:
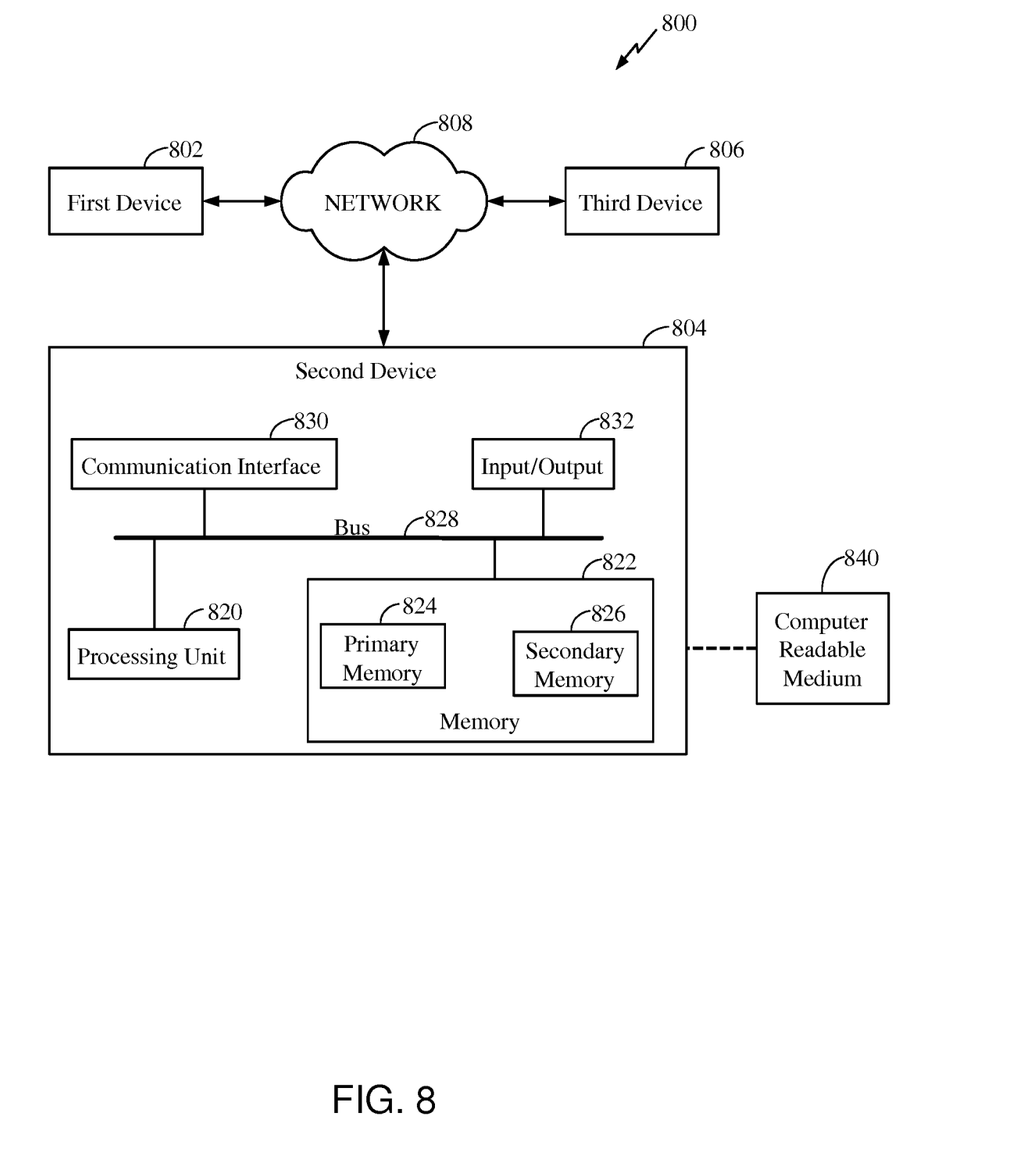
FIG. 8 is a schematic block diagram of an example computing system.

FIG. 8 is a schematic diagram illustrating an example system 800 that may include one or more devices configurable to implement techniques or processes, such as process 600 described above, for example, in connection with FIG. 6. System 800 may include, for example, a first device 802, a second device 804, and a third device 806, which may be operatively coupled together through a wireless communications network 808. First device 802 may also comprise a server capable of providing an LCI to a requesting MS based, at least in part, on a rough estimate of a location of the requesting MS. First device 802 may also comprise a server capable of providing indoor positioning assistance data relevant to a location of an LCI specified in a request from an MS. Second and third devices 804 and 806 may comprise MSs, in an aspect. Also, in an aspect, wireless communications network 808 may comprise one or more wireless access points, for example. However, claimed subject matter is not limited in scope in these respects.

First device 802, second device 804 and third device 806, as shown in FIG. 8, may be representative of any device, appliance or machine that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 802, 804, and 806, respectively, may comprise one or more of a base station almanac server, a base station, or an MS in accordance with the examples described herein.

Similarly, wireless communications network 808, as shown in FIG. 8, is representative of one or more communication links, processes, or resources configurable to support the exchange of data between at least two of first device 802, second device 804, and third device 806. By way of example but not limitation, wireless communications network 808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to wireless communications network 808.

It is recognized that all or part of the various devices and networks shown in system 800, and the processes and methods as further described herein, may be implemented using or otherwise including hardware, firmware, software, or any combination thereof. Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 830 that provides for or otherwise supports the operative coupling of second device 804 to at least wireless communications network 808. By way of example but not limitation, communication interface 830 may include a network interface device or card, a modem, a router, a switch, a transceiver, and the like.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, microcontrollers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more MSs may communicate with a femto cell via a code division multiple access ("CDMA") cellular communication protocol, for example, and the femto cell may provide the MS access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for location determination at a mobile station, the method comprising:
    transmitting one or more request messages to a server serving a venue, said one or more request messages requesting positioning assistance data;
    receiving from said server one or more response messages, said one or more response messages comprising an indication of an indoor positioning capability of said venue related to at least one location based service; and
    selecting a positioning application of a plurality of positioning applications hosted on said mobile station corresponding to one of a plurality of levels of performance based, at least in part, on said indication of said capability of said venue, said indication of said indoor positioning capability identifying availability of positioning information or said positioning assistance data.

2. The method of claim 1, wherein said indication of said indoor positioning capability in said one or more response messages comprises a flag in a header of said positioning assistance data provided to said mobile station in response to said one or more request messages.

3. The method of claim 1, wherein said indication of said indoor positioning capability indicates at least one of:
    availability of only map information of said venue and unavailability of positioning assistance data to enable or support positioning operations at said mobile station;
    availability of map information of said venue and associated routing information and unavailability of positioning assistance data to enable or support positioning operations at said mobile station;
    availability of positioning assistance data to enable or support single point position fix capability with a large median error;
    availability of positioning assistance data to enable or support positioning capability at said mobile station based, at least in part, on crowdsourced access point (AP) locations;
    availability of positioning assistance data to enable or support positioning with tracking capabilities at said mobile station;
    availability of positioning assistance data to enable or support positioning with check-in capabilities at said mobile station; or any combinations thereof.

4. The method of claim 1, wherein selecting one of a plurality of levels of performance further comprises selectively enabling a check-in feature if said indication indicates that said positioning assistance data from said server supports or enables a check-in capability.

5. The method of claim 1, wherein any of said plurality of levels of performance determine, at least in part, operation of electronic hardware in said mobile station.

6. The method of claim 1, further comprising:
    receiving an updated indication of said indoor positioning capability of said server; and
    re-selecting another positioning application of said plurality of positioning applications having another one of said levels of performance in response to said receiving said updated indication of said indoor positioning capability.

7. The method of claim 1, wherein said requested positioning assistance data comprises a map of said venue.

8. The method of claim 1, further comprising:
    querying said server for an updated indication of said indoor positioning capability of said venue.

9. The method of claim 1, further comprising:
    displaying an indicator in response to said indication of said indoor positioning capability of said venue.

10. The method of claim 1, wherein said requested positioning assistance data comprises a digital map of at least a portion of said venue, locations of one or more access points in said venue, and/or heatmap data for said venue.

11. The method of claim 1, wherein said requested positioning assistance data comprises indoor positioning assistance data.

12. The method of claim 1, further comprising:
    determining a position fix based, at least in part, on said selected level of performance.

13. The method of claim 1, further comprising:
    determining a position fix based, at least in part, on said indication of said indoor positioning capability.

14. A mobile station comprising:
    a transceiver to transmit messages to and receive messages from a communication network; and
    one or more processors to:
    initiate transmission of one or more request messages through said transceiver to a server serving a venue, said one or more request messages requesting positioning assistance data;
    obtain one or more response messages received from said server at said transceiver, said one or more response messages comprising an indication of an indoor positioning capability of said venue related to at least one location based service; and
    select a positioning application of a plurality of positioning applications hosted on said mobile station corresponding to one of a plurality of levels of performance based, at least in part, on said indication of said indoor positioning capability of said venue, said indication of said indoor positioning capability identifying availability of positioning information or said positioning assistance data.

15. The mobile station of claim 14, wherein said indication of said indoor positioning capability indicates at least one of:
availability of only map information of said venue and unavailability of positioning assistance data to enable or support positioning operations at said mobile station;
availability of map information of said venue and associated routing information and unavailability of positioning assistance data to enable or support positioning operations at said mobile station;
availability of positioning assistance data to enable or support single point position fix capability with a large median error;
availability of positioning assistance data to enable or support positioning capability at said mobile station based, at least in part, on crowdsourced access point (AP) locations;
availability of positioning assistance data to enable or support positioning with tracking capabilities at said mobile station;
availability of positioning assistance data to enable or support positioning with check-in capabilities at said mobile station; or any combinations thereof.

16. The mobile station of claim 14, wherein said one or more processors are further to:
obtain an updated indication of said indoor positioning capability of said server from said server; and
re-select another positioning application of said plurality of positioning applications having another one of said levels of performance in response to said receiving said updated indication of said indoor positioning capability.

17. The mobile station of claim 14, and further comprising a display device, and wherein said one or more processors are further to initiate presentation of an indicator on said display device in response to said indication of said indoor positioning capability of said venue.

18. An article comprising:
a non-transitory storage medium comprising machine-readable instructions stored thereon which are executable by one or more processors of a mobile station to:
initiate transmission of one or more request messages to a server serving a venue, said one or more request messages requesting positioning assistance data;
obtain one or more response messages received from said server, said one or more response messages comprising an indication of an indoor positioning capability of said venue related to at least one location based service; and
select a positioning application of a plurality of positioning applications hosted on said mobile station corresponding to one of a plurality of levels of performance based, at least in part, on said indication of said indoor positioning capability of said venue, said indication of said indoor positioning capability identifying availability of positioning information or said positioning assistance data.

19. The article of claim 18, wherein said indication of said indoor positioning capability indicates at least one of:
availability of only map information of said venue and unavailability of positioning assistance data to enable or support positioning capability at said mobile station;
availability of map information of said venue and associated routing information and unavailability of positioning assistance data to enable or support positioning operations at said mobile station;
availability of positioning assistance data to enable or support single point position fix capability with a large median error;
availability of positioning assistance data to enable or support positioning capability at said mobile station based, at least in part, on crowdsourced access point (AP) locations;
availability of positioning assistance data to enable or support positioning with tracking capabilities at said mobile station;
availability of positioning assistance data to enable or support positioning with check-in capabilities at said mobile station; or any combinations thereof.

20. The article of claim 18, wherein said instructions are further executable by said one or more processors to:
obtain an updated indication of said indoor positioning capability of said server from said server; and
re-select another positioning application of said plurality of positioning applications having another one of said levels of performance in response to said receiving said updated indication of said indoor positioning capability.

21. The article of claim 18, wherein said instructions are further executable by said one or more processors to:
initiate display an indicator on a display device in response to said indication of said indoor positioning capability of said venue.

22. A mobile station comprising:
means for transmitting one or more request messages to a server serving a venue, said one or more request messages requesting positioning assistance data;
means for receiving from said server one or more response messages, said one or more response messages comprising an indication of an indoor positioning capability of said venue related to at least one location based service; and
means for selecting a positioning application of a plurality of positioning applications hosted on said mobile station corresponding to one of a plurality of levels of performance based, at least in part, on said indication of said indoor positioning capability of said venue, said indication of said indoor positioning capability identifying availability of positioning information or said positioning assistance data.

23. The apparatus of claim 22, wherein said indication of said indoor positioning capability indicates at least one of:
availability of only map information of said venue and unavailability of positioning assistance data to enable or support positioning operations at said mobile station;
availability of map information of said venue and associated routing information and unavailability of positioning assistance data to enable or support positioning operations at said mobile station;
availability of positioning assistance data to enable or support single point position fix capability with a large median error;
availability of positioning assistance data to enable or support positioning capability at said mobile station based, at least in part, on crowdsourced access point (AP) locations;
availability of positioning assistance data to enable or support positioning with tracking capabilities at said mobile station;

availability of positioning assistance data to enable or support positioning with check-in capabilities at said mobile station; or any combinations thereof.

24. The apparatus of claim 22, and further comprising:
means for receiving an updated indication of said capability.

* * * * *